United States Patent [19]

Kajimoto et al.

[11] Patent Number: 4,673,622
[45] Date of Patent: Jun. 16, 1987

[54] MAGNETIC RECORDING MEDIUM

[75] Inventors: Noribumi Kajimoto, Saku; Yoshio Kawakami, Toubu; Masahiro Takizawa, Saku, all of Japan

[73] Assignee: TDK Electronics Co., Ltd., Tokyo, Japan

[21] Appl. No.: 577,317

[22] Filed: Feb. 7, 1984

Related U.S. Application Data

[63] Continuation of Ser. No. 388,054, Jun. 14, 1982, abandoned.

[30] Foreign Application Priority Data

Jun. 19, 1981 [JP] Japan ................... 58-94012

[51] Int. Cl.$^4$ ............................................. B32B 27/00
[52] U.S. Cl. ................................. 428/423.1; 428/522; 428/532; 428/694; 428/900

[58] Field of Search ............... 428/900, 423.1, 694, 428/522, 532; 427/127–132, 48; 252/62.54

[56] References Cited

U.S. PATENT DOCUMENTS 3,617,378  11/1971  Beck ........................... 17/235
4,234,438  11/1980  Horigome et al. ........ 252/62.54
4,267,206   5/1981  Johnson ................... 427/393.5

Primary Examiner—Bernard D. Pianalto
Attorney, Agent, or Firm—Seidel, Gonda, Goldhammer & Abbott

[57] ABSTRACT

In a magnetic recording medium having a coating for magnetic recording formed on one side of the base and a back coating on the opposite side, the back coating consists of a nonmagnetic powder dispersed in a binder which is a combination of nitrocellulose, vinyl chloride-vinyl acetate copolymer, polyurethane, and an isocyanate compound.

8 Claims, 1 Drawing Figure

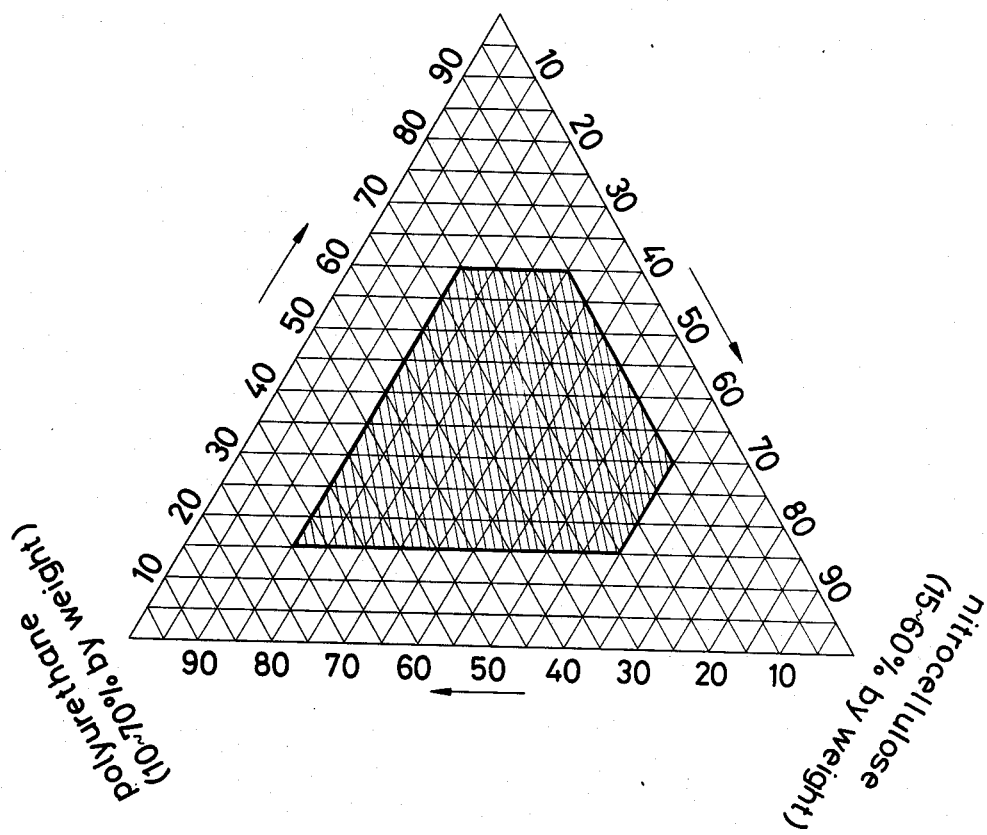

MAGNETIC RECORDING MEDIUM

This application is a continuation, of application Ser. No. 388,054, filed 6/14/82 now abandoned.

BACKGROUND OF THE INVENTION

This invention relates to improvements in a magnetic recording medium, and more specifically to improvements in a back coating to be formed on the back of the base for the magnetic recording medium.

The magnetic recording medium is in extensive use in audio and video recording and also in computer and other fields. Especially, video tape cassettes (e.g., of the VHS and beta systems) have enjoyed widespread use in recent years. Consequently, intensive and earnest studies are being carried on to realize commercial production of video cassette tapes capable of recording and playing for long periods of time, in the same manner as thin audio cassette tapes have succesfully been merchandised for extended recording and playing time.

For the tape performance the characteristics of the magnetic recording layer formed on one side of a tape base is, of course, a chief determinant. Also, it is to be noted that the characteristics of the back surface of the base are important considerations in use of the tape and from the standpoint of overall tape characteristics. Because of the trend towards adoption of ever thinner tape bases, forming a thin coating on the back of the tape for the reinforcement purpose has been proposed. However, among others the following matters become a problem:

1. Video S/N
2. Cinching (loosening of tape roll on quick stop)
3. Wear of back coating
4. Mutual adhesion of magnetic layer and back coatings on adjacent layers of wound tape The back coating is required to have these characteristics in a balanced way. Heretofore, adequate consideration has seldom been given to the characteristics in general, and no magnetic recording tape has been introduced yet which has a back coating with well-balanced characteristics.

SUMMARY OF THE INVENTION

The present invention obviates the drawbacks of the prior art magnetic recording medium and now successfully provides a magnetic recording medium having a back coating which exhibits very advantageous effects.

In accordance with the invention, a magnetic recording medium, comprising a tape base, magnetic recording layer formed on one side of the base, and a back coating formed on the other side, is provided which is characterized in that the back coating consists essentially of a nonmagnetic powder, nitrocellulose, vinyl chloride-vinyl acetate copolymer, polyurethane, and an isocyanate compound.

BRIEF DESCRIPTION OF THE DRAWING

The single FIGURE is a ternary composition diagram indicating the proportional ranges (in % by weight) of three components of the binder to be used.

DETAILED DESCRIPTION OF THE INVENTION

In the present invention, the tape base and magnetic recording layer do not constitute a characteristic feature and the employment of any materials conventionally in use as those constituents. Typically, the tape base may be made of polyethylene terephthalate, polyethylene naphthalate, polyimide, polyamide, or the like. The magnetic recording layer is formed by applying on the base a fine magnetic powder of iron oxide, cobalt-doped iron oxide, metallic iron, chromium oxide or the like, together with a suitable binder material.

According to this invention, a back coating, consisting of a nonmagnetic powder dispersed and mixed in a binder, is provided on the side of the tape base opposite to the side having the magnetic recording layer. The binder itself consists essentially of a mixture of nitrocellulose, vinyl chloride-vinyl acetate copolymer, polyurethane, and an isocyanate compound.

The nonmagnetic powder is a chosen one or plurality of what are known as pigments or fillers in the art. The powder is added to adjust the surface roughness and increase the reinforcing effect of the back coating. The surface roughness of the coating has much to do with the aforementioned cinching, and by giving a proper degree of roughness to the surface the cinching phenomenon will be reduced. While the roughness of the back coating surface also influences the running quality of the tape and the adherability between the magnetic layer and back coating to each other. Too rough back coating can cause output fluctuation. In order to suppress cinching and avoid output fluctuation, it is important to choose an appropriate degree of surface roughness for a given combination of back coating materials. The roughness is governed by the particle size, proportion, and dispersed condition of the nonmagnetic particles. As noted above, the nonmagnetic powder plays a key role in toughening the back coating and minimizing the wear of the back coating. For added reinforcing effect, the nonmagnetic powder may at least partly contain abrasive or other very hard powder. It may also contain some electrically conductive powder for an antistatic effect. Usable nonmagnetic powders include carbon black, graphite, $SiO_2$, $TiO_2$, $Al_2O_3$, $Cr_2O_3$, SiC, $CeO_2$, $CaCO_3$, zinc oxide, goethite, $\alpha$-$Fe_2O_3$, talc, kaolin, $CaSO_4$, boron nitride, graphite fluoride, and molybdenum disulfide. They may be employed singly or in combination of two or more. Typically, $CaCO_3$ or carbon is used.

The properties of the binder, in which the nonmagnetic powder is dispersed and mixed, have material effects upon the wear of the back coating, mutual adhesion of the magnetic and back coatings, etc. As the binder a thermosetting resin may be used, but preferably a vinyl chloride-vinyl acetate copolymer is used, which, upon crosslinking with an isocyanate compound, will markedly improve the wear resistance of the back coating. In addition, it has been found that the resistance to adhesion of the magnetic layer and back coatings on adjacent layers of the tape can be improved by the further addition of polyurethane which in turn forms a binder mixture consisting of vinyl chloride-vinyl acetate copolymer, isocyanate compound, and polyurethane.

The last problems left unsettled was the video S/N. Generally, provision of a back coating will lower the video S/N. The combined system of the components referred to above considerably restricts the S/N drop to a degree such that it is not practically objectionable. It has now been found that the addition of nitrocellulose to the system will reduce the S/N drop to almost zero. This is presumably because nitrocellulose promotes the dispersion of the nonmagnetic powder.

Thus, the back coating composition according to the invention, prepared by dispersing a nonmagnetic powder in a binder mixture consisting of nitrocellulose, vinyl chloride-vinyl acetate copolymer, polyurethane, and an isocyanate compound, provides significant improvements in the cinching of the tape, wear of the back coating, and mutual adhesion of magnetic and back coatings practically without a decrease in the video S/N.

The proportions of the binder components are variable over broad ranges. Generally, the proportions of nitrocellulose, vinyl chloride-vinyl acetate copolymer, and polyurethane are considered to be in the hatched region in the diagram of the attached drawing, or in the ranges specified to be 15–60wt. % nitrocellulose, –60wt. % vinyl chloride-vinyl acetate copolymer, and 10–70 wt. % polyurethane. As for the isocyanate compound, even a very small addition will give a correspondingly considerable effect, but it is usual to add in an amount of 5–80 parts on the basis of the total resin amount of the vinyl chloride-vinyl acetate copolymer and polyurethane which is 100 parts. The nonmagnetic powder too displays a fairly good effect when added in a very small proportion, and it can be used in a proper amount such that the binder used will attain an adequate bond.

The invention is illustrated by the following examples and comparative examples. The following four characteristics were determined or evaluated, respectively, in the manner briefly explained.

1. Video S/N

Using a commercially available video tape recorder of the VHS system, a 50% white level signal was recorded on the test tape with a recording current optimum for the reference tape, and the ratio of signal to noise in the video demodulated signal during playback was measured with Shibasoku Co.'s Video noise meter, Model 925C, as compared with that of a TDK reference tape set at zero decibel.

2. Cinching

On a commercially available VTR of the VHS system, the total length of the test tape was rapidly fed and then, in the course of quick rewinding, the tape was stopped at a point 50 meters short of the tape end, and then the tape was rewound rapidly to the last. The outward appearance of the rewound tape roll was visually observed. Each tape smoothly wound without any gap between the tape layers was rated good with a circle (O), and each tape wound with any gap or gaps between the layers was rated bad with a cross (X).

3. Wear of back coating

On a VHS-system VTR each test tape was driven for 100 runs at a temperature of 40° C. and a relative humidity of 80%, and then the interior of the cassette case was inspected for uncleanliness. If it was unclean the rating was "X" and if clean the rating was "O".

4. Mutual adhesion of magnetic layer and back coatings

Each tape was taken up on a reel for the VHS system VTR, allowed to stand at 60° C. for 5 days, and the inter-coating sticking or non-sticking was visually evaluated. The rating was "O" where there was no adhesion at all and "X" where there was any.

Comparative Examples and Examples of the Invention

For the examples a base film roll was made by coating a 11.5μ-thick film of polyethylene terephthalate with a magnetic coating material of the composition shown in Table 1, thus forming a magnetic recording layer 3.5 μ in thickness, and then calendering and heat-treating the magnetically coated film.

TABLE 1

| Component | Co-doped iron oxide | Nitro cellulose | Vinyl-chl. vinyl acet.-copolymer | Polyurethane | Isocyanate compound | Fatty acid |
|---|---|---|---|---|---|---|
| Wt % | 78 | 5 | 4 | 9 | 3.5 | 0.5 |

The composition shown in Table 1 included the following components:
Nitrocellulose = manufactured by Daicel, Ltd. as "Nitrocellulose"
Vinyl chloride-vinyl acetate copolymer = manufactured by UCC under the trade name "VAGH"
Polyurethane = manufactured by Farbenfabriken Bayer AG under the trade name "Desmocoll 22"
Isocyanate compound = manufactured by Farbenfabriken Bayer AG under the trade name "Desmodur L"

Each of the back coating compositions given in Table 2 was thoroughly dispersed and mixed by a ball mill and then applied on the side of the base film opposite to the magnetically coated side and heat-treated under prescribed conditions to form a 1μ-thick back coating. The back coated film was slitted into ribbons of a predetermined width, and 340 m-long video cassette tapes for the VHS system were made. The tapes were tested by the aforesaid procedures for performance evaluation. The results are also shown in Table 2.

As can be seen from Table 2, the back coating formed of a nonmagnetic powder dispersed in a binder averts cinching, and the combination of vinyl chloride-vinyl acetate copolymer, polyurethane, and isocyanate compound chosen as the binder improves the wear resistance of the back coating and the non-sticking to the magnetic coating. Further, from comparisons between Comparative Examples 2, 3 and Examples of this invention, it is obvious that the addition of nitrocellulose reduces the S/N drop to almost naught.

As described hereinbefore, the present invention, especially in connection with video cassette tapes, solves the problems on use of thin tapes for long recording and playing time, and constitutes a very significant contribution to the commercialization of such thin tapes.

TABLE 2

| | Back coating composition (wt %) | | | | | Test results | | | |
|---|---|---|---|---|---|---|---|---|---|
| Exp. No. | Nonmagnetic powder | Nitrocellulose | Vinyl chl.-vinyl acet.-copolymer | Polyurethane | Isocyanate compd. | Video S/N | Cinching | Wear resis. of back coating | Non-sticking to magnetic coating |
| Comp. Ex. | | | | | | | | | |
| 1 | No back coating | | | | | +1.5 | X | O | O |
| 2 | CaCO$_3$ 67 | 0 | 14 | 14 | 5 | +0.6 | O | O | O |

TABLE 2-continued

| Exp. No. | Back coating composition (wt %) | | | | | Test results | | | |
| --- | --- | --- | --- | --- | --- | --- | --- | --- | --- |
| | Nonmagnetic powder | Nitrocellulose | Vinyl chl.-vinyl acet.-copolymer | Polyurethane | Isocyanate compd. | Video S/N | Cinching | Wear resis. of back coating | Non-sticking to magnetic coating |
| 3 | CaCO$_3$ 34 | 0 | 28 | 28 | 10 | +0.8 | O | O | O |
| 4 | CaCO$_3$ 67 | 0 | 0 | 28 | 5 | −0.4 | O | O | X |
| 5 | CaCO$_3$ 67 | 0 | 16.5 | 16.5 | 0 | +0.5 | O | X | O |
| Example | | | | | | | | | |
| 1 | CaCO$_3$ 67 | 7 | 7 | 14 | 5 | +1.4 | O | O | O |
| 2 | CaCO$_3$ 34 | 14 | 14 | 28 | 10 | +1.5 | O | O | O |
| 3 | CaCO$_3$ 67 | 9 | 5 | 14 | 5 | +1.5 | O | O | O |

Note:
The components used were as follows:
CaCO$_3$ = made by Shiraishi Calcium Co. (average particle size: 0.04$\mu$
Vinyl chloride-vinyl acetate copolymer = UCC's "VAGH"
Polyurethane = Farbenfabriken Bayer's "Desmocoll 22"
Isocyanate compound = Farbenfabriken Bayer's "Desmodur L"
Nitrocellulose = Daicel's "Nitrocellulose"

What is claimed is:

1. A magnetic recording medium comprising a base, a coating for magnetic recording formed on one side of said base coating formed on the other side of said base, said back coating comprising a nonmagnetic powder and a binder consisting essentially of nitrocellulose, vinyl chloride-vinyl acetate copolymer, polyurethane, and an isocyanate compound, said nonmagnetic powder being dispersed in said binder, said nitrocellular in an amount sufficient to result in a drop in video sound to noise ratio of less than about 10 percent when compared to a magnetic recording medium identical to said magnetic recording medium but with no back coating.

2. A magnetic recording medium according to claim 1, wherein the nitrocellulose is in an amount of about 5 percent to about 15 percent by weight of the back coating.

3. A magnetic recording medium according to claim 1, wherein the nonmagnetic powder is calcium carbonate.

4. A magnetic recording medium according to claim 3, wherein the calcium carbonate is in an amount of about 34 percent to about 67 percent by weight of the back coating.

5. A magnetic recording medium according to claim 4, wherein the calcium carbonate is in an amount about 34 percent to about 67 percent by weight of the back coating.

6. A magnetic recording medium comprising a base, a coating for magnetic recording formed on one side of said base, and a back coating formed on the other side of said base, said back coating calcium carbonate and a binder consisting essentially of nitrocellulose, vinyl chloride-vinyl acetate copolymer, polyurethane and an isocyanate compound, said calcium carbonate powder being dispersed in said binder.

7. A magnetic recording medium comprising a base, a coating for magnetic recording formed on one side of said base, and a back coating formed on the other side of said base, said back coating comprising calcium carbonate in an amount of about 34 percent to about 67 percent by weight of the back coating and a binder consisting essentially of nitrocellulose in an amount about 7 percent to about 14 percent by weight of the back coating, vinyl chloride-vinyl acetate copolymer in an amount about 5 percent to about 14 percent by weight of the back coating, polyurethane in an amount about 14 percent to about 28 percent by weight of the back coating, and an isocyanate compound in an amount about 5 percent to about 10 percent by weight of the back coating, said calcium carbonate powder being dispersed in said binder, whereby the drop in video sound to noise rstio is less than about 10 percent when compared to a magnetic recoding medium identical to said magnetic recording medium but with no back coating.

8. A magnetic recording medium comprising a base, a coating for magnetic recoding formed on one side of said base, and a back coating formed on the other side of said base, said back coating comprising a non-magnetic powder and a binder consisting essentially of nitrocellulose in an amount of 15 to 60 percent by weight, vinyl chloride-vinyl acetate copolymer in an amount of 15 to 60 percent by weight, polyurethane in an amount of 10 to 70 percent by weight, and an isocyanate compound in an amount of 5 to 80 parts by weight per 100 parts by weight of the total amount of vinyl chloride-vinyl acetate copolymer and polyurethane, said non-magnetic powder being dispersed in said binder.

* * * * *